(12) United States Patent
Steele

(10) Patent No.: US 8,867,198 B2
(45) Date of Patent: Oct. 21, 2014

(54) PROTECTIVE CASE FOR A TABLET COMPUTER

(76) Inventor: William Steele, West Palm Beach, FL (US)

( * ) Notice: Subject to any disclaimer, the term of this patent is extended or adjusted under 35 U.S.C. 154(b) by 197 days.

(21) Appl. No.: 13/488,118

(22) Filed: Jun. 4, 2012

(65) Prior Publication Data

US 2013/0322013 A1    Dec. 5, 2013

(51) Int. Cl.
*G06G 1/16*    (2006.01)

(52) U.S. Cl.
USPC ............. 361/679.02; 361/679.3; 361/679.58; 206/320; 206/811

(58) Field of Classification Search
CPC ..... G06F 1/1656; G06F 1/1628; A45C 11/22; A45C 2011/003; H05K 5/06; H05K 5/061
USPC .................................................. 361/679.55
See application file for complete search history.

(56) References Cited

U.S. PATENT DOCUMENTS

| | | | |
|---|---|---|---|
| 2,392,787 A | 1/1946 | Vermot | |
| 5,175,873 A | 12/1992 | Goldenberg et al. | |
| 5,956,291 A * | 9/1999 | Nehemiah et al. | 367/131 |
| 6,031,524 A | 2/2000 | Kunert | |
| 6,041,924 A | 3/2000 | Tajima | |
| 6,068,119 A * | 5/2000 | Derr et al. | 206/305 |
| 6,317,313 B1 | 11/2001 | Mosgrove et al. | |
| 6,396,769 B1 | 5/2002 | Polany | |
| 6,456,487 B1 | 9/2002 | Hetterick | |
| 6,471,056 B1 | 10/2002 | Tzeng | |
| 6,536,589 B2 | 3/2003 | Chang | |
| 6,604,618 B1 | 8/2003 | Godshaw et al. | |
| 6,614,722 B2 | 9/2003 | Polany et al. | |
| 6,646,864 B2 | 11/2003 | Richardson | |
| 6,659,274 B2 * | 12/2003 | Enners | 206/305 |
| 6,954,405 B2 | 10/2005 | Polany et al. | |
| 6,995,976 B2 | 2/2006 | Richardson | |
| 7,050,712 B2 * | 5/2006 | Shimamura | 396/27 |
| 7,069,063 B2 * | 6/2006 | Halkosaari et al. | 455/575.8 |
| 7,158,376 B2 | 1/2007 | Richardson et al. | |
| 7,180,735 B2 | 2/2007 | Thomas et al. | |
| 7,230,823 B2 | 6/2007 | Richardson et al. | |
| 7,312,984 B2 * | 12/2007 | Richardson et al. | 361/679.41 |
| 7,359,184 B2 | 4/2008 | Lord | |
| 7,495,895 B2 * | 2/2009 | Carnevali | 361/679.26 |
| 7,609,512 B2 | 10/2009 | Richardson et al. | |
| 7,613,386 B2 * | 11/2009 | Shimamura | 396/27 |
| 7,688,580 B2 * | 3/2010 | Richardson et al. | 361/679.56 |
| 7,733,642 B2 * | 6/2010 | Liou et al. | 361/679.41 |
| 7,775,354 B2 | 8/2010 | Latchford et al. | |
| 7,907,394 B2 * | 3/2011 | Richardson et al. | 361/679.3 |
| 8,033,418 B2 * | 10/2011 | Estlander | 220/678 |
| 8,102,483 B2 | 1/2012 | Perry et al. | |
| 8,403,136 B1 * | 3/2013 | Tsai | 206/320 |
| 8,503,170 B1 * | 8/2013 | Hsu et al. | 361/679.02 |
| 2007/0109730 A1 * | 5/2007 | Shigyo et al. | 361/600 |
| 2007/0261978 A1 * | 11/2007 | Sanderson | 206/320 |

(Continued)

*Primary Examiner* — Anthony Q Edwards
(74) *Attorney, Agent, or Firm* — F. Aviel Sheyin-Stevens

(57) ABSTRACT

Described is a protective case for a tablet computer providing a compartment for receiving and holding the tablet computer in a watertight environment. The protective case can further include a mounting adaptor attachable to a mounting apparatus for holding the protective case in a fixed or stationary position on a boat. The protective case allows the optimal use and protection of a tablet computer with its connections in many environments, including protecting the tablet computer from water damage on boats.

13 Claims, 3 Drawing Sheets

(56) References Cited

U.S. PATENT DOCUMENTS

| | | | |
|---|---|---|---|
| 2008/0164267 A1* | 7/2008 | Huber | 220/660 |
| 2009/0260844 A1* | 10/2009 | Tseng | 174/50.5 |
| 2010/0200456 A1* | 8/2010 | Parkinson | 206/701 |
| 2011/0073505 A1* | 3/2011 | Stiehl | 206/320 |
| 2012/0000908 A1* | 1/2012 | So | 220/281 |
| 2012/0043235 A1* | 2/2012 | Klement | 206/320 |
| 2012/0228169 A1* | 9/2012 | Huang | 206/320 |
| 2012/0314354 A1* | 12/2012 | Rayner | 361/679.01 |
| 2013/0027849 A1* | 1/2013 | Berumen | 361/679.01 |

\* cited by examiner

PROTECTIVE CASE FOR A TABLET COMPUTER

BACKGROUND OF THE INVENTION

The subject invention concerns a protective case for a tablet computer that is substantially watertight, and can advantageously be used to carry, preserve, and protect a tablet computer while being used on a boat. The protective case surrounds and encloses the tablet computer when the tablet computer is disposed inside the protective case. The protective case resists the ingress of water, thereby making the tablet computer placed inside it to be relatively unaffected by water.

Widespread demand for cases useful for carrying, protecting and preserving the integrity of delicate electronic devices came in conjunction with the global dispersion of mobile phones. Still susceptible to the dangers of the elements, a variety of leather, plastic, metallic, rubber, neoprene, and other synthetics were shaped into cases for mobile phones. As the technology quickly evolved, phone cases became laptop computer cases, and later on, laptop cases became tablet computer cases. As a practical and trendy accessory, cases for tablet computers have become an expression of who we are and what we do.

Boating has increased in popularity over the decades and is a popular activity for millions of boaters worldwide. The emergence of lightweight and portable tablet computers have become popular with boating enthusiasts who enjoy listening to music, surfing the web, etc., while engaging in boating events. Also, electronic devices, such as chartplotters, depth finders, fish finders, GPS, radar, etc., and various hybrid devices that combine the function of two or more of these devices are widely used on boats. Integration of functions provided by two or more of these devices is desirable to avoid the cost of purchasing multiple devices and the distraction of looking at several different screens for information. Many of the functions of these devices, with sufficient connections and software applications, can be integrated into, and displayed on the touch screen of, a tablet computer. However, the current technology available for tablet computers is not adapted for their use while boating and can allow the tablet computers to be damaged by water contact from waves or spray.

Currently, there are no protective waterproof cases for a tablet computer which may be used on boats that allow the protection of the tablet computer as well as providing the user with optimum functionality of the tablet computer while retained within the protective case. Typical waterproof cases enclose the tablet computer, but require a user to pull the tablet computer out of the case for optimal usage, thereby exposing the tablet computer to water and possible damage. Such tablet computer cases as currently manufactured are not constructed to withstand being submersed or being exposed to water, particularly if the cases include an opening to allow for connections to the tablet computers inside.

Also, boats generally have mounting apparatuses or brackets, typically located on the dashboard, through which various boating instruments and electronic devices may be held in a fixed position. Thus, an electronic device can be held in a fixed position by the mounting apparatus or the mounting bracket on a boat, but may be removed for safekeeping as necessary. Currently, there does not exist a protective case for a tablet computer that can be held in a fixed position by a mounting apparatus or bracket on a boat, which can protect the tablet computer from water damage as well as provide the user with optimal functionality of the tablet computer.

While protective covers and methods for overcoming some of the limitations of water related activities when using a tablet computer have been developed, boaters have not previously been able to acquire a mountable, protective case for tablet computers that allows the protection of the tablet computer from water damage as well as providing the user with optimal functionality of the tablet computer on boats.

DESCRIPTION OF THE RELATED ART

In order that the invention may be appreciated in its proper context, reference is made to a number of prior patents.

Devices for carrying and protecting electronic devices which are not computers have been described. See, for example, U.S. Pat. No. 5,175,873; U.S. Pat. No. 6,031,524; U.S. Pat. No. 6,317,313; U.S. Pat. No. 6,456,487; U.S. Pat. No. 6,471,056; and U.S. Pat. No. 6,536,589; However, these devices are not directed to being utilized to carry, protect, and use a tablet computer, and are not directed to waterproof cases that can be mounted or used on boats.

Carrying cases and protective devices for computers but which are not waterproof have also been described. See, for example, U.S. Pat. No. 6,604,618; U.S. Pat. No. 6,646,864; U.S. Pat. No. 6,995,976; U.S. Pat. No. 7,230,823; and U.S. Pat. No. 7,359,184. These protective cases, though relating to computers or tablet computers are not directed to mountable, waterproof cases that can be utilized to carry, protect, and use a tablet computer on boats.

The following are directed to waterproof enclosures in general, but are not directed to mountable, waterproof cases that can be utilized to carry, protect, and use a tablet computer on boats: U.S. Pat. No. 2,392,787; U.S. Pat. No. 6,041,924; U.S. Pat. No. 6,068,119; U.S. Pat. No. 6,396,7691; U.S. Pat. No. 6,614,722; U.S. Pat. No. 6,954,405; U.S. Pat. No. 7,775,354; and U.S. Pat. No. 8,102,483.

Finally, waterproof enclosures for tablet computers or other items in general, have been described, but are not directed to mountable, waterproof cases that can be utilized to carry, protect, and use a tablet computer on boats. More specifically, U.S. Pat. No. 6,659,274, to Enners, describes a waterproof casing for use with a portable handheld computer comprising a separable plastic casing having a watertight rubber seal, but does not allow for waterproof connections during its use in the case. U.S. Pat. No. 7,180,735 to Thomas, et al, describes a protective enclosure for an interactive flat-panel control device having an electrical adapter disposed within the protective enclosure covered with an elastomeric covering Richardson et al. describe several variations of protective cases in U.S. Pat. No. 7,158,376; U.S. Pat. No. 7,609,512; U.S. Pat. No. 7,688,580; and U.S. Pat. No. 7,907,394. However, the protective cases described in the patents of Richardson et al have several disadvantages, including the complexity of manufacture and design.

Regardless of the merits, features, or advantages of the above-cited references, none achieves, or fulfills the purposes of the present invention. Accordingly, what is needed is a mountable, protective case for tablet computers that allows the protection of the tablet computer from water damage as well as providing the user with full functionality of the tablet computer.

SUMMARY OF THE INVENTION

It is an objective of the present invention to provide for an advantageous protective case for use with a tablet computer in a moist or wet environment such as on boats. One object of this invention, is to provide a waterproof, protective case that serves as an affixable or mountable case for containing a tablet computer within a waterproof compartment bounded by the case while the tablet computer is being used on boats, even when power cables or the like used in conjunction with the tablet computer are duly engaged. It is another object of this invention to provide a waterproof, protective case for a tablet computer that can be adapted to be mounted on mounting apparatuses or brackets on a boat, while restraining or limiting the ingress of water to the tablet computer.

The subject invention is a protective case for a tablet computer comprising a front face and a rigid back face connected by, or formed to, comprise substantially rigid top, bottom, left and right sides bounding a compartment for receiving and holding the tablet computer, in a removable manner, in a watertight environment. The top, bottom, front, back and sides of the protective case form the body of the case, or housing, in which additional advantageous features can be provided.

The front face of the case can comprise a transparent membrane allowing the use of a touch screen or buttons of said tablet computer when disposed within the protective case. The membrane is preferably a thermoplastic material that provides for interactive use of the touch screen on the tablet computer. The membrane may have a suitable margin of other protective materials around it provided that the transparent membrane is disposed over the touch screen and any front buttons of the tablet computer, the transparent membrane being sufficiently responsive to allow tactile inputs on the front-side of the transparent membrane to be communicated to the touch screen of the tablet computer through the transparent membrane without allowing the ingress of water, and the transparent membrane being such that the screen of the tablet computer is visible through the transparent membrane, so that information displayed on the screen of the tablet computer will be visible through the transparent membrane.

The bottom of the protective case comprises a watertight connector hub for connecting the tablet computer to a power source.

The top of the case comprises an opening for inserting, receiving or removing the tablet computer, and preferably comprises watertight closure means. The closure means can preferably comprise, integral therewith, a jack or pin connector for connecting an input/output connector to an input/output port of the tablet computer. In a preferred embodiment, the jack or pin connector is provided in a watertight manner as part of or integral with the watertight closure means. In another embodiment, the watertight jack or pin connector is detachable from the watertight closure means.

The closure means is preferably a sealable panel or door which engages the opening in the top of the case, and more preferably can be affixed to the protective case by one or more hinge. In another embodiment, the closure means may be detachable from the protective case. In a preferred embodiment, the closure means further comprises a lockable latch which can further secure the closure in a watertight manner to protect against water or moisture ingress into the compartment of the protective case.

The interior surface of the compartment bounded by the housing forming the protective case can preferably comprise grooves, ridges or protrusions or otherwise be shaped to conform to the outer surface of the tablet computer in order to secure the tablet computer contained therein. This "form-fitted" aspect of the interior surface of the compartment can also advantageously guide the tablet computer during insertion into the case so that the port connector meets and mates to a connecting hub integral with the bottom of the case.

In another preferred embodiment, the protective case can further comprise one or more mounting adaptor for engaging with a mounting apparatus or a mounting bracket on a boat. In one embodiment, the mounting adaptor comprises an aperture for receiving a prong, stem or bolt provided for engaging and affixing the protective case to a mounting bracket. In another embodiment, the protective case can comprise two or more mounting adaptors. Preferably, the two mounting adaptors are positioned in the sides of the protective case, and more preferably, includes at least one mounting adaptor on the left side of the protective case and at least one mounting adaptor on the right side of the protective case. The aperture of the mounting adaptor is preferably reinforced and can be threaded for receiving or engaging a threaded bolt. Alternatively, the aperture may be unthreaded for receiving and engaging an unthreaded stem or bolt. An unthreaded aperture preferably includes a means for interlocking the protective case to the bracket such as a spring lock.

It is also preferable to manufacture the protective case of the subject invention using a material that allows for transmitting and receiving wireless communications through said material.

The protective case can comprise, integral in the body of the case, sufficient transparent material to enable the viewing of the indicator lights of a tablet computer inside the case, provided the transparent material does not compromise the rigidity of the case, the watertight aspect of the case, or the suitability of the case for being mounted by a mounting apparatus or a mounting bracket on a boat.

The case may have air-permeable watertight vents that can permit the cooling fans of a tablet computer to force air exchange to dissipate heat.

The subject invention further comprises a method for using a tablet computer on a boat or other moist or wet environment by providing a watertight protective case in accordance with the descriptions herein.

DETAILED DESCRIPTION OF THE INVENTION

Figure 1B:
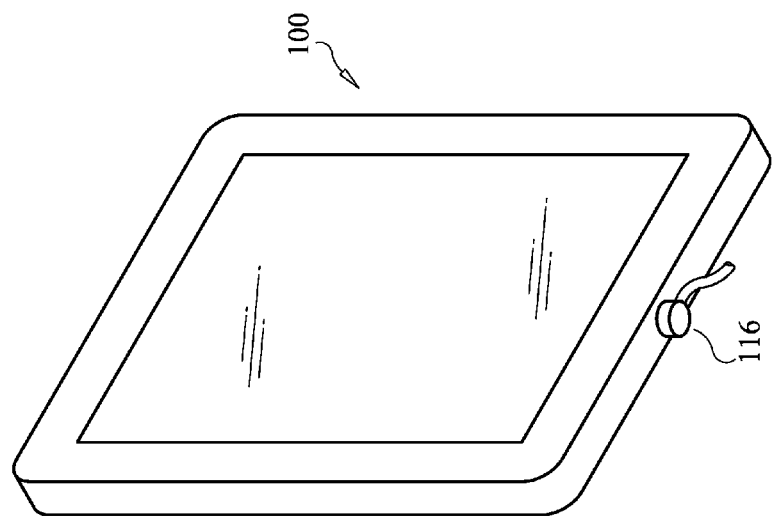
FIG. 1B shows a front perspective view of a protective case for tablet computer in accordance with the subject invention, illustrating the bottom of the protective case comprising the waterproof power connector adaptor.
Figure 1A:
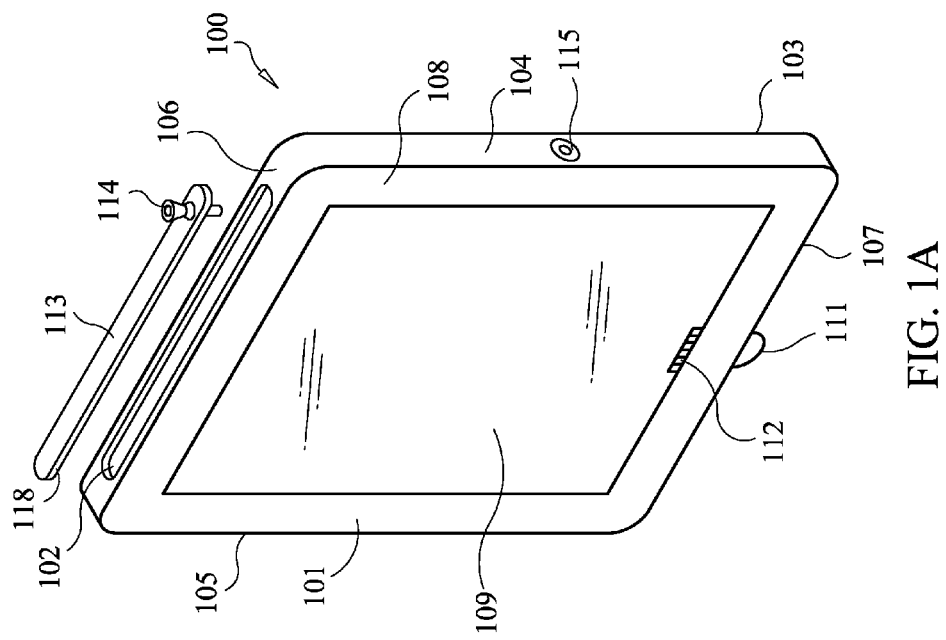
FIG. 1A shows an exploded front perspective view of an embodiment of a protective case for tablet computer in accordance with the present invention.

The various features and advantages of the present invention may be more readily understood with reference to the following detailed description taken in conjunction with the accompanying drawings. The features and advantages of the present invention, and a manner of attaining them, will become more apparent by reference to the following description of some embodiments of the invention:

FIG. 1A is a front perspective view of a first exemplary embodiment of a waterproof, protective case 100 for use with tablet computers. Protective case 100 shown in FIG. 1A comprises a substantially rigid housing 101 bounding a chamber 102 for holding a tablet computer (not shown) in a watertight environment. Preferably the chamber is a size and shape that conforms to the tablet computer in order to retain the tablet computer in a secured position within the chamber, but allows for easy insertion and removal of the tablet computer. In one embodiment, the interior surface of chamber 102 is shaped, e.g., being form-fitted or comprising groove, ridge or protrusion that conforms to the shape of the outer surface of the tablet computer. This groove, ridge or protrusion is preferably provided to facilitate insertion and removal of the tablet computer from the protective case, as well as to secure the tablet computer when held within the chamber. Further the groove, ridge or protrusion, or form-fitted shape of the inner surface of the chamber can provide a guide to ensure the tablet computer aligns for connecting with a connecting hub provided in the bottom of the protective case. This will prevent damage to the adapters and connections of the tablet computer while preventing a misaligned insertion of the tablet computer. In another embodiment, the interior surface of chamber 102 is without any groove or protrusion, but sized to conform to the tablet computer in order to retain the tablet computer in a secured position within the chamber and to ensure that the tablet computer aligns for connecting with a connecting hub provided in the bottom of the protective case.

The housing of case 100 comprises substantially rigid back 103, left side 104, and right side 105 and a top 106 and bottom 107. Preferably, the back, sides, and bottom of the protective case can be formed by being molded as singular unit, for example, by use of a substantially rigid moldable plastic. In one preferred embodiment, as shown, the top is provided as a separable panel or door that engages an opening formed in the top of the protective case.

The front face 108 of protective case 100 comprises a separate transparent panel or membrane 109 affixed to the case by a waterproof seal. Other embodiments may have a suitable, substantially rigid margin 110 around the perimeter edge of the front face of the protective case to surround the transparent membrane. Margin 110 can be formed by being molded as singular unit with the back, sides, and bottom of the protective case. In any case, the transparent membrane is disposed over the touch screen and any front buttons of the tablet computer, when the tablet computer is enclosed in the protective case 100 so as to allow viewing of the touch screen or buttons by a user. The transparent membrane 109 can be permanently affixed to the waterproof case 100, using a permanent adhesive, and preferably a waterproof adhesive. Alternatively, the transparent front panel can be removable, provided it remains watertight when placed and secured in position in use.

In a preferred embodiment, the transparent membrane 109 is provided as a material that is sufficiently pliable or flexible to be responsive to and allow tactile inputs by a user on its outer face to be communicated to the touch screen of the tablet computer. The membrane 109 is suitably transparent, so that information displayed on the screen of the tablet computer is visible through the transparent membrane 109. Also, membrane 109 is preferably dimensioned to have sufficient thinness to allow data entry on the touch screen of the tablet computer while allowing buttons on the front of the tablet computer to be easily operated, without allowing the ingress of water into the inner chamber of the protective case 100. Membrane 109 may be flexible or semi-rigid and preferably comprises a suitable thermoplastic or any other waterproof material that has the texture that permits interactivity with the touch screen of a tablet computer, as well as sufficient transparency. The appropriate selection of materials for transparent membrane 109 will enable touch screen inputs, such as from a finger, to be transmitted accurately to the front panel of a tablet computer placed inside protective case 100, while being suitably transparent such that the touch screen of the inserted tablet computer is substantially visible through membrane 109.

Protective case 100 comprises a watertight connector hub 111 integral with the bottom of the protective case and interfaces with a dock connector 112 for connecting one or more cables allowing connection to a peripheral device or a power supply for a tablet computer while enclosed in protective case 100. Preferably, connector hub 111 spans the housing of the protective case and provides for dock connector 112 to engage with the port connector of the tablet computer. Connector hub 111 is useful for attaching the tablet computer simultaneously to multiple external resources in a watertight manner. The connector hub 111 will allow a variety of signals and power, through a single connector, to simplify the process of docking the tablet computer.

Alternatively, a pair of interconnected connectors (a plug and a receptacle) may be disposed through the watertight connector hub to allow connection, inside the chamber, with the port connector of the tablet computer, wherein one connector (a plug) is disposed in the interior chamber of the protective case, and one connector (a receptacle) is disposed at the exterior of the case, and capable of providing a watertight seal. In another embodiment, connector hub 111 may be made watertight through the use of suitable O-rings, or other sealable materials. A preferred embodiment of protective case 100 comprises a fixed, watertight connector hub 111 integral therewith, and may be used to support or align the tablet computer inside case 100. Another embodiment has a detachable, watertight connector hub that may be made to accommodate various connection requirements of the tablet computer.

Protective case 100 has on its top an opening 102 that allows for the insertion and the removal of a tablet computer. The opening can be closed using a closure means 113 such as a panel or door that seals the chamber in a watertight manner when closed. Panel 113 may be provided so as to contact the tablet computer disposed within the protective case to secure the tablet computer therewithin, as well as facilitate a secure connection to the connection hub 111 when the panel 113 is closed. In one preferred embodiment, the top panel comprises a cushion disposed on the inner face of the panel to ensure contact between the panel and the tablet computer.

In another preferred embodiment, the watertight panel 113 comprises a fixed jack or pin connector which is integral with and spans the top panel and is affixed thereto in a watertight manner. Alternatively, the jack or pin connector may be removable to allow for different connection requirements of a tablet computer. The watertight panel 113 preferably comprises a watertight connector 114 integral therewith for input and output links with a tablet computer. In a preferred embodiment, the watertight connector 114 is integral to the watertight panel 113 for automatically connecting an input/output connector into an input/output port of the tablet computer when the panel is closed. In another embodiment, connector 114 can comprise a pair of interconnected connectors (a plug and a receptacle) disposed through the watertight panel 113, wherein one connector (a plug) is provided in the interior of panel 113 communicating the inner chamber of the protective case with the exterior of the protective case in a watertight manner. The connector can engage the jack or the port of the tablet computer. The companion piece of the connector 114 (a receptacle) is disposed in and communicates interior chamber 102 with the exterior of panel 113. The connectors are provided with a watertight seal through the panel 113. In another embodiment, the connector 114 may be made watertight through the use of suitable O-rings, or other sealable materials.

The watertight panel 113 preferably engages the opening at the top of the protective case 100 in a watertight manner. One embodiment of the watertight panel comprises a rubber ridge 118 around its edge that may engage with the inner perimeter of opening 102 at the top of the protective case 100 to form a watertight seal.

Boats typically have apparatuses or brackets for stationary mounting in a fixed position of various boating instruments and electronic devices comprising suitable mounting adaptors. Protective case 100 can preferably comprise a mounting adaptor 115. The protective case can preferably comprise at least one mounting adaptor, and more preferably comprises a mounting adaptor on each of the left and right sides of the protective case. More preferably, the adaptors are integrated with the protective case and cannot communicate with the inner chamber of case 102 to prevent the ingress of water. Each adaptor can be suitably positioned in symmetry with another adaptor on the opposite side of protective case 100, such that both adaptors could be used to mount the protective case 100 in a level and fixed position on a boat. In a preferred embodiment, the mounting adaptor is an aperture formed in the body of the protective case which can engage a mounting stem which secures the protective case to a mounting bracket. The aperture can comprise threads to engage a mated and threaded stem or bolt, or can be unthreaded and engage the stem or bolt by another means, such as a spring lock or other interlocking means as is known in the art.

Protective case 100 can be mounted onto a mounting apparatus or bracket typically found on boats through the use of its mounting adaptors. When required, the protective case can easily be disengaged from the mounting apparatus or the mounting bracket to safeguard any tablet computer held inside the protective case, for security purposes.

Preferably, protective case 100 of the invention provides for wireless communications, allowing infrared, or radio frequencies, or the like, to pass through case 100. The appropriate selection of materials for protective case 100 will enable various radio frequency transmissions, such as cellular phone communications or other wireless communication protocols.

Boats typically have an integrated system of electronic instruments that boaters find useful for boating activities, and may be used to guide the boat under any conditions. These instruments include radars, chartplotters, depth finders, fish finders, emergency locators, etc. The integration of these devices for boating is very important as it becomes quite distracting to look at several different screens. With sufficient software applications and connections, many of the functions of these devices can be appropriately integrated and displayed on the touch screen of a tablet computer; however, the tablet computer may be exposed to potential water damage without adequate protection. The protective case provides an affordable means of optimally using a tablet computer on boats while protecting the tablet computer from the ingress of water, such that the tablet computer held in the protective case, with appropriate connections and software applications, can function in lieu of various electronic devices typically found on boats, at significant savings to boaters.

FIG. 1B shows a front perspective view of a protective case 100 according to the subject invention, illustrating a protective cover 116 disposed over connector 111. Protective cover 116 can be provided to engage with the protective case in a watertight manner to prevent further the ingress of water or moisture into the inner chamber of the case when a power source is connected to the tablet computer disposed therewithin.

Figure 2:
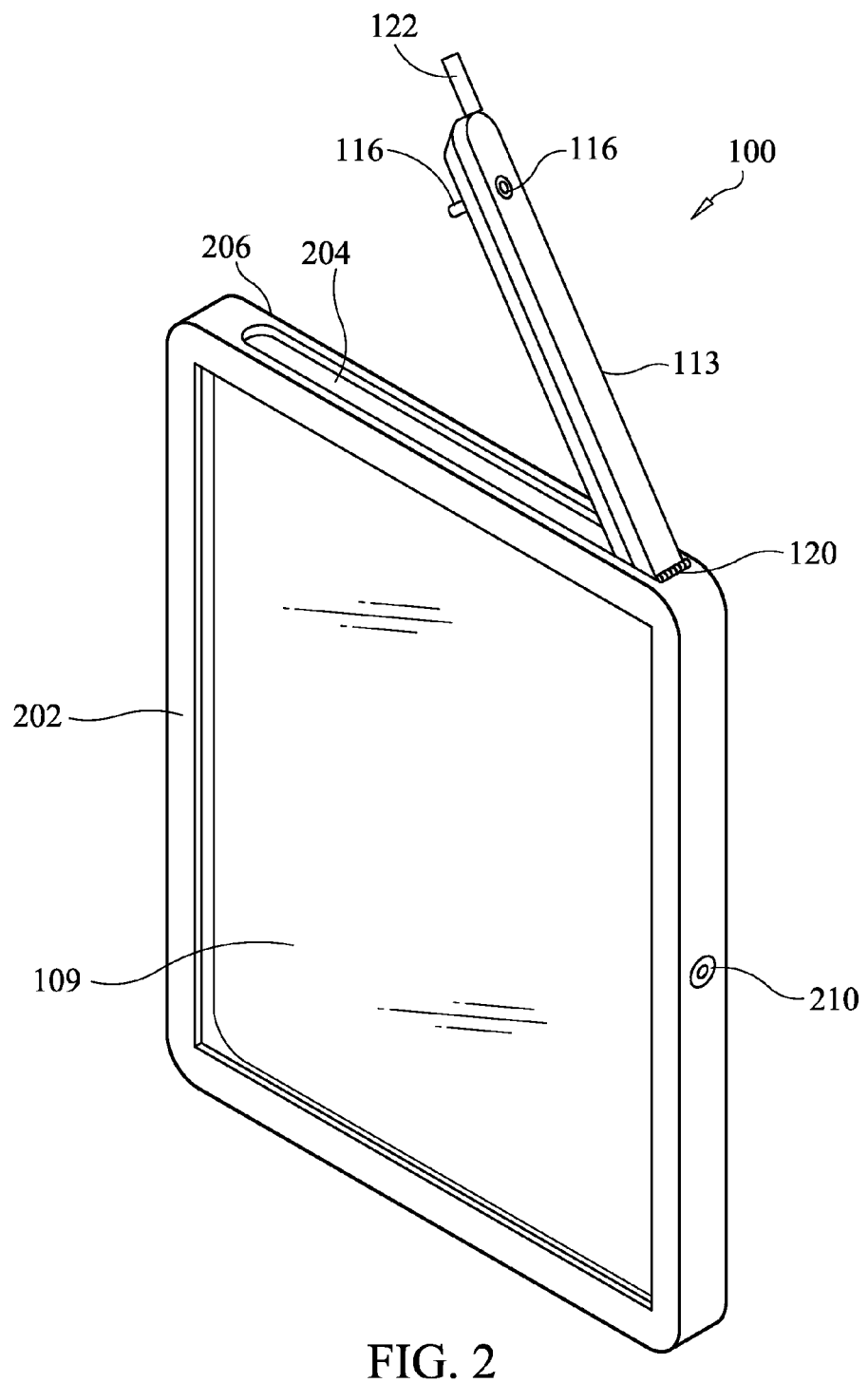
FIG. 2 shows a front perspective view of an embodiment of a protective case for tablet computer in accordance with the present invention, illustrating additional features of the subject invention, including a hinged top closure means (panel or door)

FIG. 2 illustrates a perspective view of the front of an embodiment of protective case 100 comprising a transparent membrane 109 and a suitable margin 202 of other protective materials around the transparent membrane. Panel 113 is shown as an embodiment where the panel is hingedly engaged to the protective case employing a hinge 120 to open the case and provides access to the inner chamber 204 of protective case 100. For added durability and to prevent further the ingress of water, margin 202 along with the back, sides and bottom of protective case 100 can be formed by being molded as a singular unit by the use of a substantially rigid moldable plastic, or other suitable materials. Margin 202 is fashioned so that the transparent membrane 102 is disposed over, but allows complete view of, the touch screen and any front buttons of a tablet computer enclosed in protective case 100.

Protective case 100 can comprise a watertight panel or door 113 that can be hingedly affixed to the top of the protective case 100 or may be detachable. In a preferred embodiment as shown in FIG. 2, the watertight panel 113 is affixed by hinge 120 hingedly affixing the panel to the top of the protective case 100. Hinged panel 113 advantageously provides for the plug of connector system 116 in panel 113 to mate with and engage the jack or the port at the top of the tablet computer as panel 113 is closed. Panel 113 of protective case 100 can further comprise a latch 122 on the opposite side of hinge 120 that could be used to lock panel 113 to lock receptacle 112 (shown in FIG. 3) when the panel is closed.

Hinged panel 113 engages the opening at the top of the protective case 100 in a watertight manner. An embodiment of panel 113 comprises a rubber ridge 118 around its edge that may engage with peripheral groove 206 in the inner perimeter of opening 102 at the top of protective case 100 to form a watertight seal.

Figure 3:
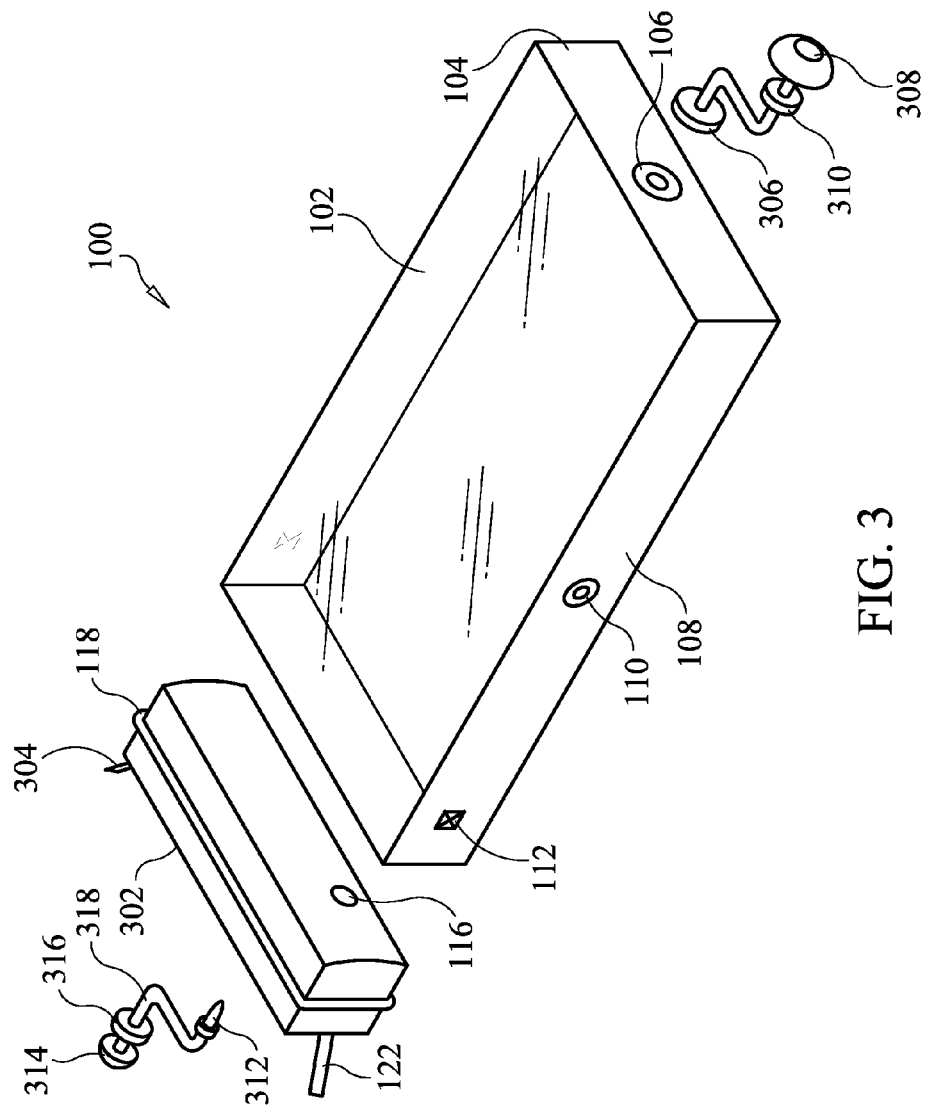
FIG. 3 shows an exploded front perspective view of an embodiment of the present invention, illustrating a detachable connector hub at the bottom of the case, the top closure means comprising a sealable panel which engages the opening in the top of the case, detachable from the protective case as well as a detachable jack or pin connector integral with the closure means.

FIG. 3 illustrates a front perspective view of an embodiment of protective case 100 showing the front face of the protective case comprising a transparent membrane 102 and a detachable, watertight closure means 302, a sealable, detachable panel which engages the opening in the top of the protective case in a watertight manner. Panel 302 is completely detachable from protective case 100. In this embodiment, the top of protective case 100 can be fully opened to ease the insertion, positioning, connection, and removal of the tablet computer.

A watertight access opening for a detachable connector hub may be provided through bottom 104, while detachable panel 302 may comprise a watertight access opening that allows for a jack or other connectors to be disposed into the inner chamber of the protective case for connecting an input/output connector to an input/output port of the tablet computer. These watertight access openings may include holes that have a moveable watertight plug, or any type of watertight button or lever.

A power supply connector or other connectors may be connected in a watertight manner to a tablet computer held inside protective case 100 through the watertight access opening in bottom 104 by disposing the connector and its wire through a gasket, O-ring, or other seal 310, which fits snugly into the watertight access opening in bottom 104, to prevent water from entering the inner chamber of protective case 100. In another embodiment, a detachable connector hub can be inserted in a watertight manner into bottom 104 of the protective case 100 through a watertight access opening. The detachable connector hub may comprise a connector plug 306 to be disposed into the inner chamber of protective case 100 for connecting to the connector port of a tablet computer inside protective case 100, a connector receptacle 308, and a gasket, O-ring, or other seal 310 that can be inserted into the watertight access opening in bottom 104 to prevent water from entering the inner chamber of protective case 100.

A separate device, such as a peripheral component, e.g., an external speaker system or headphone, may be connected in a watertight manner to a tablet computer held inside protective case 100 through the watertight access opening in panel 302 by disposing the plug and the wire of the device through a gasket, O-ring, or other seal 316, which fits snugly into the watertight access opening in panel 302, to prevent water from entering the inner chamber of protective case 100. An embodiment of the watertight, detachable panel 302 has a detachable connector that comprises an adapter jack 314 connected by an adapter cable 318 through gasket 316 to an adapter plug 312 that may be disposed inside the chamber of protective case 100 for connecting to an input/output port of the tablet computer. Another embodiment of the detachable panel 302 has a fixed connector that comprises adapter jack 314 integrally fixed to detachable panel 302, connected by adapter cable 318 through gasket 316 to adapter plug 312 disposed inside the chamber of protective case 100 for connecting to an input/output port of the tablet computer.

Protective case 100 may comprise a watertight sealing system of ridges and grooves made of non-rigid, or semi-rigid waterproof materials. For example, the protective case can comprise peripheral groove around the rim of the inside of the protective case. Also, watertight panel 302 may comprise a ring of interlocking ridge 118 that may be in form of a suitably shaped O-ring, or other seal. When watertight panel 302 is disposed inside the top of the protective case, the interlocking ridge 118 and the peripheral groove inside the protective case will be engaged thereby forming a watertight seal that will restrict the ingress of water into protective case 100.

Panel 302 can comprise one or more lockable latch to secure the top panel to the protective case when the panel is in a closed position at the top of the protective case, thereby securing the tablet computer placed inside the protective case. In a preferred embodiment, one end of panel 302 comprises a first lockable latch 122 and the other side of panel 302 comprises a second lockable latch 304. The lockable latches can be used to secure panel 302 to lock receptacle 112 and another lock receptacle matingly positioned on the left and right sides of protective case 100 when panel 302 is closed.

The foregoing description of the invention has been presented for purposes of illustration to enable any person skilled in the art to which the invention pertains to make and use it. The best mode contemplated by the inventor of carrying out this invention is not intended to be exhaustive or to limit the invention to the precise form disclosed. The teachings of the description can be used to make other modifications and variations. The embodiment was chosen and described to explain the principles of the invention and its practical application, thereby enabling those skilled in the art to which the invention pertains to utilize the invention in various embodiments and modifications suited to the particular use contemplated.

What is claimed is:

1. A watertight protective case for a tablet computer, said case comprising a front face and a rigid back face connected by or formed to comprise rigid top, bottom, left and right sides bounding a compartment for removably receiving and holding a tablet computer in a watertight environment,
    said front face of the case comprising a transparent membrane allowing the use of a touch screen or buttons of said tablet computer;
    said bottom of said case comprising a watertight connector hub integral therewith for connecting the tablet computer to a power source or other connectors,
    said top comprising an opening for inserting, receiving or removing the tablet computer,
    said top comprising a watertight closure panel that engages the opening in the top of the case in a sealable manner,
    said watertight closure panel comprising a jack or pin connector integral therewith for connecting an input/output connector to an input/output port of the tablet computer.

2. The protective case of claim 1, wherein the panel is affixed by one or more hinge to the protective case.

3. The protective case of claim 1, wherein said closure means further comprises a lockable latch.

4. The protective case of claim 1, said case further comprising one or more mounting adaptor for engaging with a mounting apparatus provided on a boat.

5. The protective case of claim 4, wherein said mounting adaptor is provided as a pair of mounting adaptors symmetrically positioned on a left and right side of the protective case.

6. The protective case of claim 1, wherein said protective case comprising a material that allows transmitting and receiving of wireless communications through said material.

7. The protective case of claim 6, wherein said wireless communications comprise transmission and reception of communications selected from the group consisting of infrared, radio frequency, and cellular phone.

8. The protective case of claim 1, wherein said transparent membrane comprises a waterproof material that permits interactive communication with the touch screen of a tablet computer.

9. The protective case of claim 1, wherein said transparent membrane comprises a waterproof material providing visibility of the touch screen display on a tablet computer.

10. The protective case of claim 1, wherein the transparent membrane comprises a thermoplastic material.

11. A method of protecting from water damage a tablet computer used on a boat or a wet or moist environment, said method comprising
    providing a protective case of claim 1,
    inserting a tablet computer into the protective case,
    closing the top panel to provide a watertight seal.

12. The method of claim 11, wherein said tablet computer is automatically connected to a connector hub when disposed within the protective case.

13. The method of claim 11 wherein said tablet computer is automatically connected with a jack or pin connector when the top panel is closed.

* * * * *